(12) United States Patent
Zheng et al.

(10) Patent No.: US 11,772,573 B1
(45) Date of Patent: Oct. 3, 2023

(54) VEHICLE-MOUNTED BRACKET

(71) Applicant: Dongguan Lanhai Composite Materials Technology Co., Ltd., Dongguan (CN)

(72) Inventors: Zhixu Zheng, Dongguan (CN); Shenghu Wu, Dongguan (CN); Shenghai Yu, Dongguan (CN); Dangzhen Xie, Dongguan (CN)

(73) Assignee: Dongguan Lanhai Composite Materials Technology Co., Ltd., Dongguan (CN)

( * ) Notice: Subject to any disclaimer, the term of this patent is extended or adjusted under 35 U.S.C. 154(b) by 0 days.

(21) Appl. No.: 18/325,939

(22) Filed: May 30, 2023

(30) Foreign Application Priority Data

May 5, 2023 (CN) .......................... 202310496631.6

(51) Int. Cl.
*B60R 11/02* (2006.01)
*H02J 50/10* (2016.01)
*H04M 1/04* (2006.01)
*B60R 11/00* (2006.01)

(52) U.S. Cl.
CPC .......... *B60R 11/0241* (2013.01); *H02J 50/10* (2016.02); *H04M 1/04* (2013.01); *B60R 2011/007* (2013.01); *B60R 2011/0068* (2013.01); *B60R 2011/0085* (2013.01)

(58) Field of Classification Search
CPC ................. H04M 1/04; B60R 11/0241; B60R 2011/0068; B60R 2011/007; B60R 2011/0085; H02J 50/10
See application file for complete search history.

(56) References Cited

U.S. PATENT DOCUMENTS

| | | | |
|---|---|---|---|
| 6,888,940 B1* | 5/2005 | Deppen | B60R 11/0241 379/454 |
| 2017/0174147 A1* | 6/2017 | Elharar | F16M 13/022 |
| 2023/0051385 A1* | 2/2023 | Ma | G06F 13/385 |

FOREIGN PATENT DOCUMENTS

| | | |
|---|---|---|
| CN | 209320851 U | 8/2019 |
| CN | 212098682 U | 12/2020 |
| CN | 214255853 U | 9/2021 |

\* cited by examiner

*Primary Examiner* — Tuan D Nguyen
(74) *Attorney, Agent, or Firm* — Nitin Kaushik

(57) ABSTRACT

The present disclosure relates to the technical field of a bracket, and discloses a vehicle-mounted bracket, comprising: a support base, a wireless charger, a magnetic-suction finger ring assembly, an adjustment assembly and a locking assembly, the wireless charger and the support base being combined to form a magnetic-suction wireless charging vehicle-mounted bracket, the magnetic-suction finger ring assembly and the support base being combined to form a magnetic-suction vehicle-mounted bracket, and the adjustment assembly being used for rotatably adjusting a support state of the support base. The application increases the functionality of the vehicle-mounted bracket.

10 Claims, 8 Drawing Sheets

VEHICLE-MOUNTED BRACKET

CROSS-REFERENCE TO RELATED APPLICATIONS

The application claims priority to Chinese patent application No. 2023104966316, filed on May 5, 2023, the entire contents of which are incorporated herein by reference.

TECHNICAL FIELD

The present disclosure relates to the technical field of a bracket, and in particular to a vehicle-mounted bracket.

BACKGROUND

In the prior art, mobile phone vehicle-mounted bracket technology mostly uses an integrated vehicle-mounted bracket or an integrated wireless charging vehicle-mounted bracket. However, the integrated vehicle-mounted bracket is completely internal to the bracket due to the magnetic-suction component, is not detachable and has a single function. The integrated wireless charging vehicle-mounted bracket has no fast charging function.

Therefore, how to provide a vehicle-mounted bracket so as to increase the functionality thereof becomes an urgent technical problem to be solved.

SUMMARY

The technical problem to be solved by the present disclosure is how to provide a vehicle-mounted bracket so as to increase the functionality thereof.

To this end, according to a first aspect, an embodiment of the application discloses a vehicle-mounted bracket for supporting and wirelessly charging a mobile phone, comprising: a support base, a wireless charge, a magnetic-suction finger ring assembly, an adjustment assembly and a locking assembly, an accommodating groove being provided in the support base, the accommodating groove being used for placing the wireless charger or the magnetic-suction finger ring assembly, and several protrusions being provided on an inner wall of the accommodating groove, and the protrusions respectively abutting against the wireless charger or the magnetic-suction finger ring assembly, the wireless charger and the support base being combined to form a magnetic-suction wireless charging vehicle-mounted bracket, the magnetic-suction finger ring assembly and the support base being combined to form a magnetic-suction vehicle-mounted bracket, the support base, the adjustment assembly and the locking assembly being successively connected, the adjustment assembly being used for performing rotational adjustment on a support state of the support base, and the locking assembly locking the adjustment assembly so as to lock the vehicle-mounted bracket in the vehicle.

The present disclosure further provides that the support base is provided with a first notch for facilitating disassembly and assembly of the wireless charger.

The present disclosure further provides that the support base is provided with a second notch for facilitating reception of a cable of the wireless charger.

The present disclosure further provides that the magnetic-suction finger ring assembly comprises a first finger ring and a second finger ring hinged to each other, the second finger ring abutting the protrusion, the second finger ring having a magnetic strip mounted therein.

The present disclosure further provides that a mounting groove is provided in the second finger ring, a magnetic conductive sheet attracting the magnetic strip is provided in the mounting groove, and a cover plate for closing the mounting groove is provided in the second finger ring.

The present disclosure further provides that the magnetic strip has a notched annular configuration.

The present disclosure further provides that the adjustment assembly comprises a first adjustment seat and a second adjustment seat rotatably connected, the first adjustment seat being fixedly connected to the support base, the first adjustment seat being provided with an accommodating cavity, the second adjustment seat being provided with an adjustment ball end embedded in the accommodating cavity, and a third adjustment cover being threadedly connected to the first adjustment seat.

The present disclosure further provides that the locking assembly comprises a first locking frame and a second locking frame, the first locking frame being sleeved on one end, opposite to the adjustment ball end, of the second adjustment seat, the second locking frame being detachably connected to the second adjustment seat, and the first locking frame being provided with a first clamping portion, a second clamping portion, corresponding to the first clamping portion, being provided on the second locking frame, a rotary shaft being rotatably connected in the first locking frame, a locking block being threaded on the rotary shaft, and the locking block, the first clamping portion and the second clamping portion being all used for locking the vehicle-mounted bracket in the vehicle.

The present disclosure further provides that the first locking frame is sheathed with a rotary cover, the rotary shaft is provided with a first gear, and the rotary cover is provided with a second gear engaged with the first gear.

The present disclosure further provides that an O-type sealing ring is mounted in the rotary cover.

The present disclosure has the following advantageous effects: forming a magnetic-suction wireless charging vehicle-mounted bracket by combining a wireless charger and a support base, and forming a magnetic-suction vehicle-mounted bracket by combining a magnetic-suction finger ring assembly and a support base, thereby providing a vehicle-mounted bracket, making the vehicle-mounted bracket detachable and increasing the functionality of the vehicle-mounted bracket.

BRIEF DESCRIPTION OF DRAWINGS

In order that the detailed embodiments of the application or the technical solutions in the prior art may be more clearly understood, a brief description of the drawings that are required to be used in the detailed embodiments or the prior art will be made. It is obvious that the drawings in the description below are some implementations of the present disclosure, and other drawings can be obtained by a person skilled in the art without involving any inventive effort therefrom.

Figure 1:
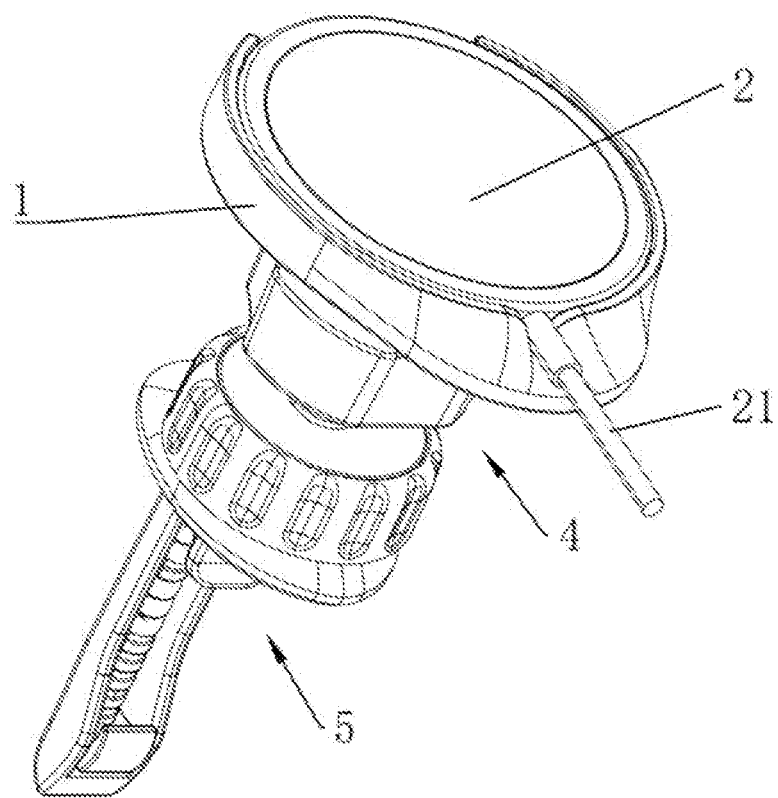
FIG. 1 is a structural schematic diagram of a magnetic-suction wireless charging vehicle-mounted bracket in a vehicle-mounted bracket disclosed in the embodiment.

Reference numerals: 1, support base; 11, accommodating groove; 12, protrusion; 13, first notch; 14, second notch; 2, wireless charger; 21, cable; 3, magnetic-suction finger ring assembly; 31, first finger ring; 32, second finger ring; 321, mounting groove; 33, magnetic strip; 34, magnetic conductive sheet; 35, cover plate; 4, adjustment assembly; 41, first adjustment seat; 411, accommodating cavity; 42, second adjustment seat; 421, adjustment ball end; 43, third adjustment cover; 5, locking assembly; 51, first locking frame; 511, first clamping portion; 52, second locking frame; 521, second clamping portion; 53, rotary shaft; 531, first gear; 54, locking block; 55, rotary cover; 551, second gear; 552, third gear; 56, sealing ring; 57, decorative cover; 58, shifting component.

DETAILED DESCRIPTION OF THE EMBODIMENTS

In order that the objects, technical solutions and advantages of the present disclosure will become more apparent, a more particular description of the disclosure will be rendered by reference to the drawings and embodiments thereof. It should be understood that the particular embodiments described herein are illustrative only and are not limiting.

In the description of the present disclosure, it should be noted that, unless expressly specified or limited otherwise, the terms "mounted", "connected", and "coupled" are to be interpreted broadly, e.g. either fixedly or detachably, or integrally, which may be a mechanical connection or an electrical connection, can be directly connected or indirectly connected through an intermediate medium, and can also be inner communication between two elements, and can be a wireless connection or a wired connection. The specific meaning of the terms in the present disclosure can be understood in detail by those skilled in the art.

In describing the present disclosure, it should be noted that the terms "central", "upper", "lower", "left", "right", "vertical", "horizontal", "inner", "outer", and the like designate orientations or positional relationships based on the orientation or positional relationships shown in the drawings, are merely for convenience in describing the application and to simplify the description, and do not indicate or imply that the referenced devices or elements must have a particular orientation, be constructed and operated in a particular orientation, and thus should not be construed as limiting the invention. Furthermore, the terms "first", "second", and "third" are used for descriptive purposes only and are not to be construed as indicating or implying relative importance.

Furthermore, the technical features involved in the different embodiments of the present disclosure described below can be combined with each other as long as they do not conflict with each other.

Disclosed in an embodiment of the present disclosure is a vehicle-mounted bracket, as shown in FIGS. 1-8, for supporting and wirelessly charging a mobile phone, comprising: a support base 1, a wireless charger 2, a magnetic-suction finger ring assembly 3, an adjustment assembly 4 and a locking assembly 5, an accommodating groove 11 being provided in the support base 1, the accommodating groove 11 being used for placing the wireless charger 2 or the magnetic-suction finger ring assembly 3, and several protrusions 12 being provided on an inner wall of the accommodating groove 11, and the protrusions 12 respectively abutting against the wireless charger 2 or the magnetic-suction finger ring assembly 3, the wireless charger 2 and the support base 1 being combined to form a magnetic-suction wireless charging vehicle-mounted bracket, the magnetic-suction finger ring assembly 3 and the support base 1 being combined to form a magnetic-suction vehicle-mounted bracket, the support base 1, the adjustment assembly 4 and the locking assembly 5 being successively connected, the adjustment assembly 4 being used for performing rotational adjustment on a support state of the support base 1, and the locking assembly 5 locking the adjustment assembly 4 so as to lock the vehicle-mounted bracket in the vehicle.

It should be noted that the magnetic-suction wireless charging vehicle-mounted bracket is formed by the combination of the wireless charger 2 and the support base 1, and the magnetic-suction finger ring assembly 3 and the support base 1 form a magnetic-suction vehicle-mounted bracket, thereby providing a vehicle-mounted bracket, making the vehicle-mounted bracket detachable and increasing the functionality of the vehicle-mounted bracket, and solving the problem of the single function of the conventional magnetic-suction vehicle-mounted bracket.

Further, by providing the accommodating groove 11, an original MagSafe charger can be mounted to improve charging efficiency. The mobile phone can be placed 360 degrees on the vehicle-mounted support, and the angle of the mobile phone can be placed through its own requirements. The embodiment of the present disclosure discloses a vehicle-mounted bracket, which combines the functions of a conventional vehicle-mounted bracket and a daily bracket.

Figure 2:
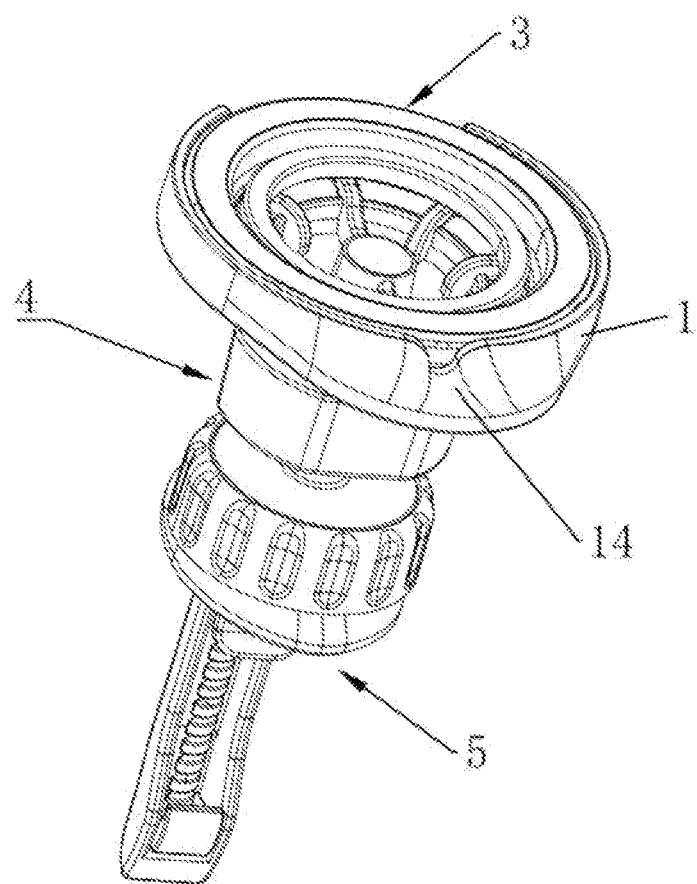
FIG. 2 is a structural schematic diagram of a magnetic-suction vehicle-mounted bracket in a vehicle-mounted bracket disclosed in the embodiment.
Figure 3:
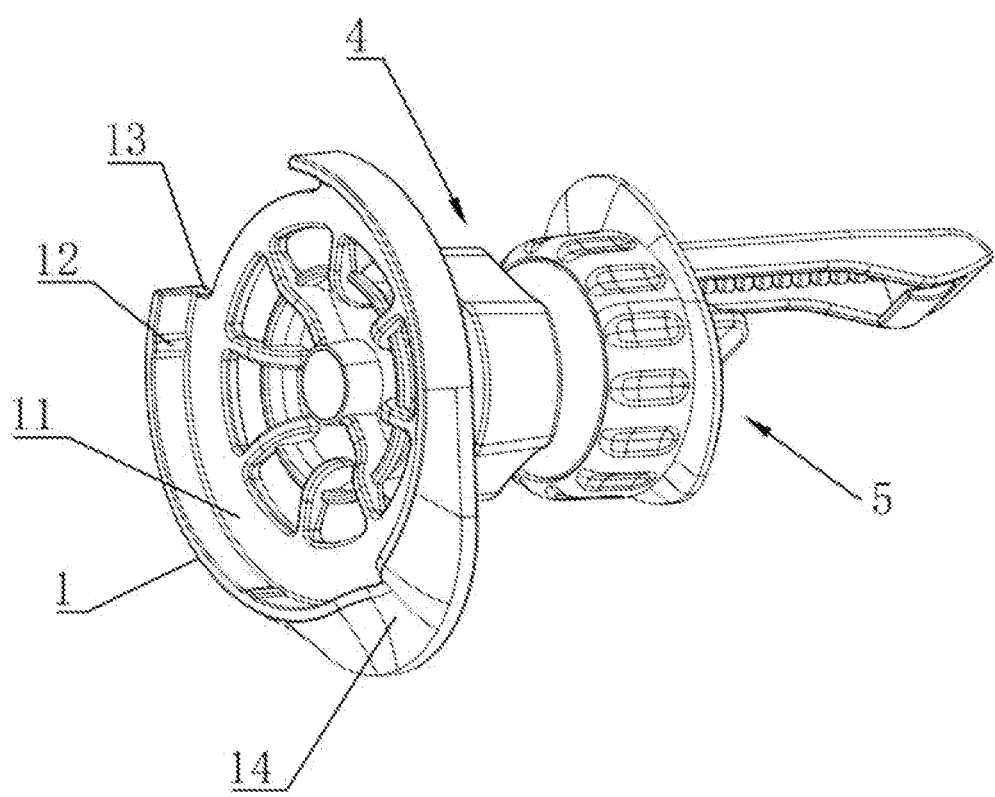
FIG. 3 is a partial structural schematic diagram of a vehicle-mounted bracket disclosed in the embodiment.

As shown in FIGS. 1-3, the support base 1 is provided with a first notch 13, and the first notch 13 is used for facilitating the disassembly and assembly of the wireless charger 2. It should be noted that when the wireless charger 2 is mounted in the accommodating groove 11, the protrusion 12 has an abutting action, and the provision of the first notch 13 facilitates the user to quickly take out the wireless charger 2, thereby facilitating the switching of the function of the vehicle-mounted bracket.

As shown in FIGS. 1-3, the support base 1 is provided with a second notch 14 for conveniently receiving a cable 21 of the wireless charger 2.

Figure 5:
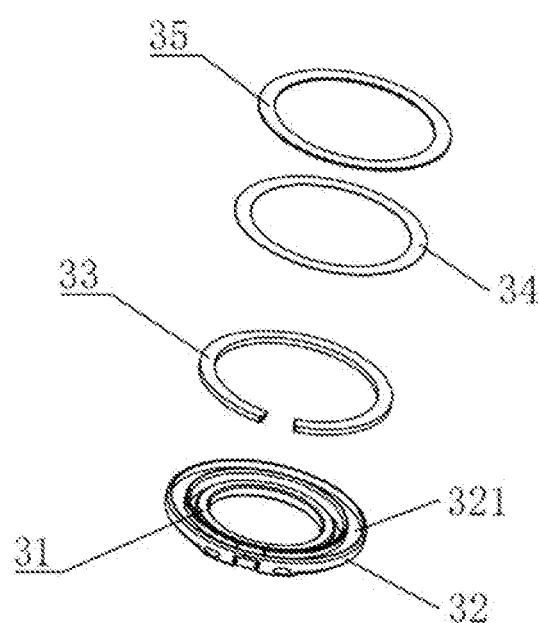
FIG. 5 is an explosive structural schematic diagram of a magnetic-suction finger ring assembly in a vehicle-mounted bracket disclosed in the embodiment.
Figure 6:
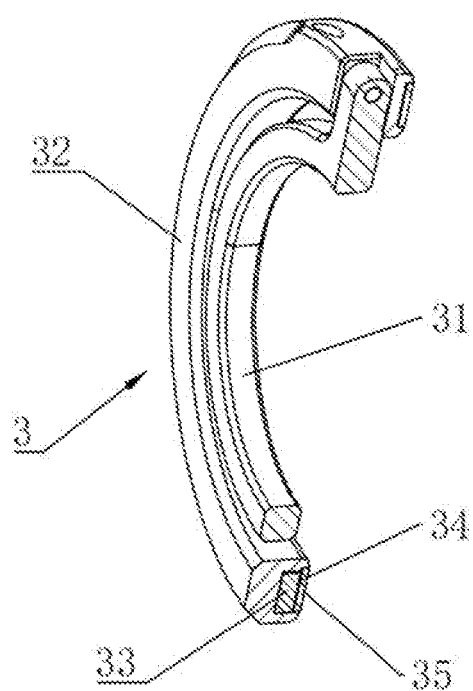
FIG. 6 is a sectional structural schematic diagram of a magnetic-suction finger ring assembly in a vehicle-mounted bracket disclosed in the embodiment.

As shown in FIGS. 2, 5 and 6, the magnetic-suction finger ring assembly 3 includes a first finger ring 31 and a second finger ring 32 hinged to each other, the second finger ring 32 abutting against the protrusion 12, and a magnetic strip 33 being mounted in the second finger ring 32. It needs to be stated that the magnet enables the magnetic-suction finger ring assembly 3 to have a magnetic-suction effect, facilitating the attraction of the magnetic-suction finger ring assembly 3 to the mobile phone housing, and facilitating serving as a mobile phone support. In addition, the provision of the first finger ring 31 facilitates the user's fingers to pass through, thereby facilitating the user's grip on the mobile phone.

As shown in FIGS. 2, 5 and 6, a mounting groove 321 is provided in the second finger ring 32, a magnetic conductive sheet 34 attracting the magnetic strip 33 is provided in the mounting groove 321, and a cover plate 35 for closing the mounting groove 321 is provided in the second finger ring 32. It should be noted that the magnetic force of the magnetic stripe 33 is better transmitted by the magnetic conductive sheet 34 attracting the magnetic strip 33.

As shown in FIGS. 2, 5 and 6, the magnetic strip 33 has a notched annular configuration.

Figure 4:
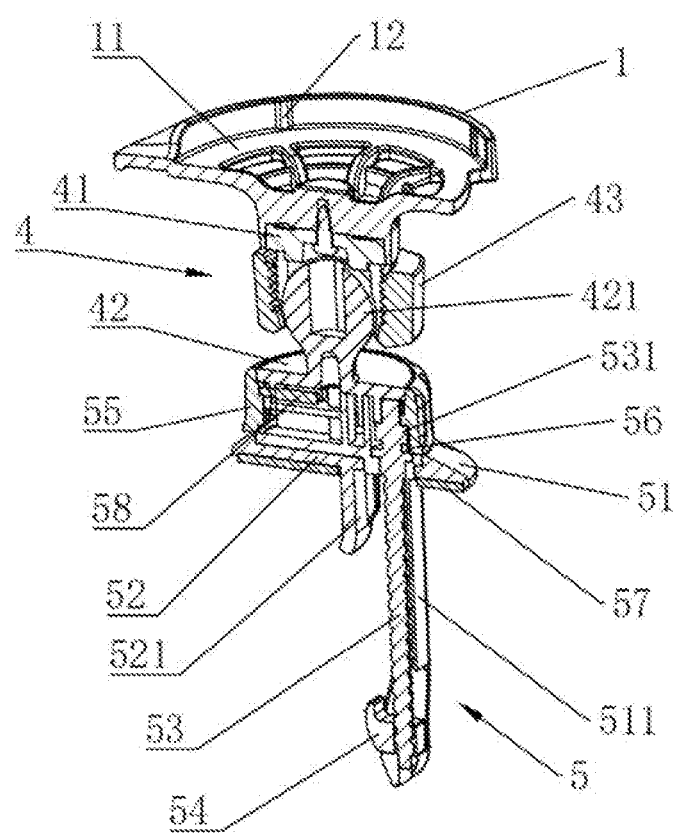
FIG. 4 is a partial half-sectional structural schematic diagram of a vehicle-mounted bracket disclosed in the embodiment.
Figure 7:
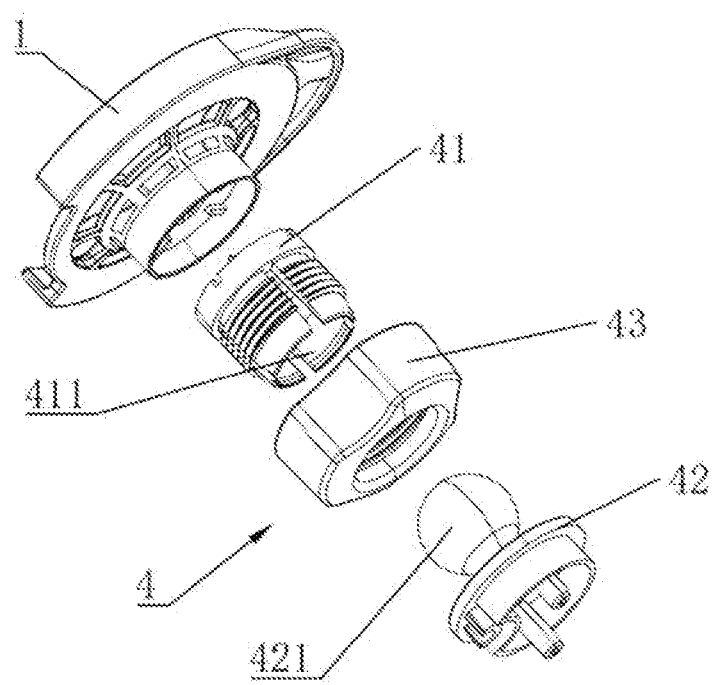
FIG. 7 is an explosive structural schematic diagram of an adjustment assembly in a vehicle-mounted bracket disclosed in the embodiment.

As shown in FIGS. 1, 4 and 7, the adjustment assembly 4 comprises a first adjustment seat 41 and a second adjustment seat 42 which are rotatably connected. The first adjustment seat 41 is fixedly connected to the support base 1. The first adjustment seat 41 is provided with an accommodating cavity 411. The second adjustment seat 42 is provided with an adjustment ball end 421 embedded in the accommodating cavity 411, and a third adjustment cover 43 is threadedly connected to the first adjustment seat 41. It should be noted that since the adjustment ball end 421 is rotatably connected to the first adjustment seat 41, such that the first adjustment seat 41 drives the support base 1 to rotate, thereby facilitating the adjustment of the current position of the mobile phone and facilitating the operation.

As shown in FIGS. 1, 3, 4 and 8, the locking assembly 5 comprises a first locking frame 51 and a second locking frame 52, wherein the first locking frame 51 is sheathed on one end, opposite to the adjustment ball end 421, of the second adjustment seat 42. The second locking frame 52 is detachably connected to the second adjustment seat 42, the first locking frame 51 is provided with a first clamping portion 511, the second locking frame 52 is provided with a second clamping portion 521 corresponding to the first clamping portion 511, and a rotary shaft 53 is rotatably connected in the first locking frame 51. A locking block 54 is threadedly connected on the rotary shaft 53. The locking block 54, the first clamping portion 511 and the second clamping portion 521 are used to lock the vehicle-mounted bracket in the vehicle. In practice, the second locking frame 52 is screwed to the second adjustment seat 42, and the second locking frame 52 is fitted with a decorative cover 57.

As shown in FIGS. 1, 3, 4 and 8, the first locking frame 51 is sheathed with a rotary cover 55, a first gear 531 is provided on the rotary shaft 53, and a second gear 551 is provided in the rotary cover 55 to be engaged with the first gear 531. In the specific implementation, the first gear 531 and the rotary shaft 53 are of an integrally formed structure. The rotary cover 55 is formed integrally with the second gear 551. A shifting component 58 is mounted in the first locking frame 51, a third gear 552 is provided in the rotary cover 55, the shifting component 58 is sheathed with a spring abutting against the first locking frame 51, and one end of the shifting component 58 is used for abutting against the third gear 552. By the rotational movement of the rotary cover 55, the shifting component 58 is brought into contact with the third gear 552 to make a sound, which makes it clear to the user that the locking block 54 is being moved and adjusted.

It should be noted that by the rotation of the rotary cover 55, since the first gear 531 meshes with the second gear 551, the rotary shaft 53 is driven to rotate, and since the locking block 54 is in a threaded connection with the rotary shaft 53, the locking block 54 is driven to move in a direction close to or away from the second clamping portion 521. When the locking block 54 moves in the direction close to the second clamping portion 521, the vehicle-mounted bracket is easily locked in the vehicle by the locking engagement of the first clamping portion 511, the second clamping portion 521 and the locking block 54.

Figure 8:
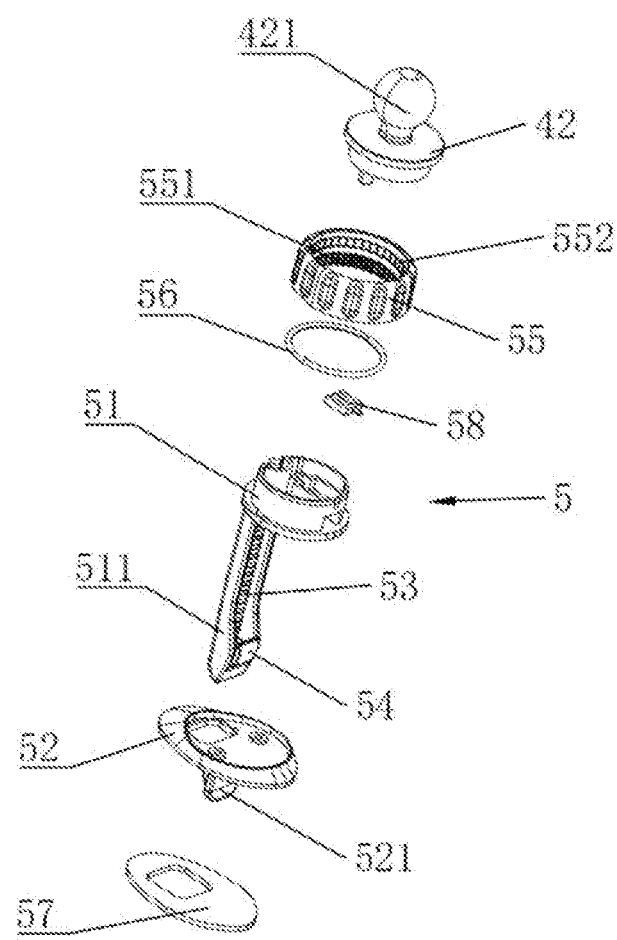
FIG. 8 is an explosive structural schematic diagram of a locking assembly in a vehicle-mounted bracket disclosed in the embodiment.

As shown in FIGS. 4 and 8, an O-type sealing ring 56 is mounted in the rotary cover 55. Note that the sealing ring 56 functions as a seal to prevent external dust or water from entering the rotary cover 55.

Working principle: The wireless charger 2 and the support base 1 are combined to form the magnetic-suction wireless charging vehicle-mounted bracket, and the magnetic-suction finger ring assembly 3 and the support base 1 are combined to form the magnetic-suction vehicle-mounted bracket, thereby providing a vehicle-mounted bracket, making the vehicle-mounted bracket detachable and increasing the functionality of the vehicle-mounted bracket.

It is to be understood that the above-described embodiments are merely illustrative for clarity and are not restrictive of the implementations. It will be apparent to those skilled in the art that various other modifications and variations can be made on the basis of the present disclosure. All embodiments need not be, and cannot be, exhaustive. Obvious modifications or variations derived therefrom are within the scope of protection of the present disclosure.

What is claimed is:

1. A vehicle-mounted bracket for supporting and wirelessly charging a mobile phone, comprising: a support base (1), a wireless charger (2), a magnetic-suction finger ring assembly (3), an adjustment assembly (4) and a locking assembly (5), an accommodating groove (11) being provided in the support base (1), the accommodating groove (11) being used for placing the wireless charger (2) or the magnetic-suction finger ring assembly (3), and several protrusions (12) being provided on an inner wall of the accommodating groove (11), and the protrusions (12) respectively abutting against the wireless charger (2) or the magnetic-suction finger ring assembly (3), the wireless charger (2) and the support base (1) being combined to form a magnetic-suction wireless charging vehicle-mounted bracket, the magnetic-suction finger ring assembly (3) and the support base (1) being combined to form a magnetic-suction vehicle-mounted bracket, the support base (1), the adjustment assembly (4) and the locking assembly (5) being successively connected, the adjustment assembly (4) being used for performing rotational adjustment on a support state of the support base (1), and the locking assembly (5) locking the adjustment assembly (4) so as to lock the vehicle-mounted bracket in the vehicle.

2. The vehicle-mounted bracket according to claim 1, wherein the support base (1) is provided with a first notch (13) for facilitating disassembly and assembly of the wireless charger (2).

3. The vehicle-mounted bracket according to claim 2, wherein the support base (1) is provided with a second notch (14) for facilitating reception of a cable (21) of the wireless charger (2).

4. The vehicle-mounted bracket according to claim 1, wherein the magnetic-suction finger ring assembly (3) comprises a first finger ring (31) and a second finger ring (32) hinged to each other, the second finger ring (32) abutting the protrusion (12), the second finger ring (32) having a magnetic strip (33) mounted therein.

5. The vehicle-mounted bracket according to claim 4, wherein a mounting groove (321) is provided in the second finger ring (32), a magnetic conductive sheet (34) attracting the magnetic strip (33) is provided in the mounting groove (321), and a cover plate (35) for closing the mounting groove (321) is provided in the second finger ring (32).

6. The vehicle-mounted bracket according to claim 4, wherein the magnetic strip (33) has a notched annular configuration.

7. The vehicle-mounted bracket according to claim 1, wherein the adjustment assembly (4) comprises a first adjustment seat (41) and a second adjustment seat (42) rotatably connected, the first adjustment seat (41) being fixedly connected to the support base (1), the first adjustment seat (41) being provided with an accommodating cavity (411), the second adjustment seat (42) being provided with an adjustment ball end (421) embedded in the accommodating cavity (411), and a third adjustment cover (43) being threadedly connected to the first adjustment seat (41).

8. The vehicle-mounted bracket according to claim 7, wherein the locking assembly (5) comprises a first locking frame (51) and a second locking frame (52), the first locking frame (51) being sleeved on one end, opposite to the adjustment ball end (421), of the second adjustment seat (42), the second locking frame (52) being detachably connected to the second adjustment seat (42), and the first locking frame (51) being provided with a first clamping portion (511), a second clamping portion (521), corresponding to the first clamping portion (511), being provided on the second locking frame (52), a rotary shaft (53) being rotatably connected in the first locking frame (51), a locking block (54) being threaded on the rotary shaft (53), and the locking block (54), the first clamping portion (511) and the second clamping portion (521) being all used for locking the vehicle-mounted bracket in the vehicle.

9. The vehicle-mounted bracket according to claim 8, wherein the first locking frame (51) is sheathed with a rotary cover (55), the rotary shaft (53) is provided with a first gear (531), and the rotary cover (55) is provided with a second gear (551) engaged with the first gear (531).

10. The vehicle-mounted bracket according to claim 9, wherein an O-type sealing ring (56) is mounted in the rotary cover (55).

\* \* \* \* \*